May 12, 1925.

M. I. MAGOON

LAWN MOWER

Filed Nov. 5, 1923

1,537,850

Witnesses:

Inventor:
Marius I. Magoon
By Joshua R. H. Potts
His Attorney.

Patented May 12, 1925.

1,537,850

UNITED STATES PATENT OFFICE.

MARIUS I. MAGOON, OF HAMMOND, INDIANA.

LAWN MOWER.

Application filed November 5, 1923. Serial No. 672,798.

*To all whom it may concern:*

Be it known that I, MARIUS I. MAGOON, a citizen of the United States, and a resident of the city of Hammond, county of Lake, and State of Indiana, have invented certain new and useful Improvements in Lawn Mowers, of which the following is a specification.

This invention relates to certain novel improvements in lawn mowers and has for one of its principal objects the provision of an improved construction which will be highly efficient in use.

Among the several objects of the invention is the provision for oiling the stationary blade of a lawn mower to prevent the same from rusting, and to reduce the friction as the spiral cutting knives of the lawn mower pass over the straight edge of the stationary blade and to lessen the possibility of dulling the cutting knives of the lawn mower by reason of such friction.

A further object of the invention is the provision of an oiling device which is constructed in a manner whereby the oil is continually fed to the edge of the stationary blade.

Other objects will appear hereinafter.

The invention consists in the combinations and arrangements of parts hereinafter described and claimed.

The invention will be best understood by reference to the accompanying drawing showing the preferred form of construction, and in which, Fig. 1 is a vertical sectional view of a lawn mower embodying the invention;

Figure 1:
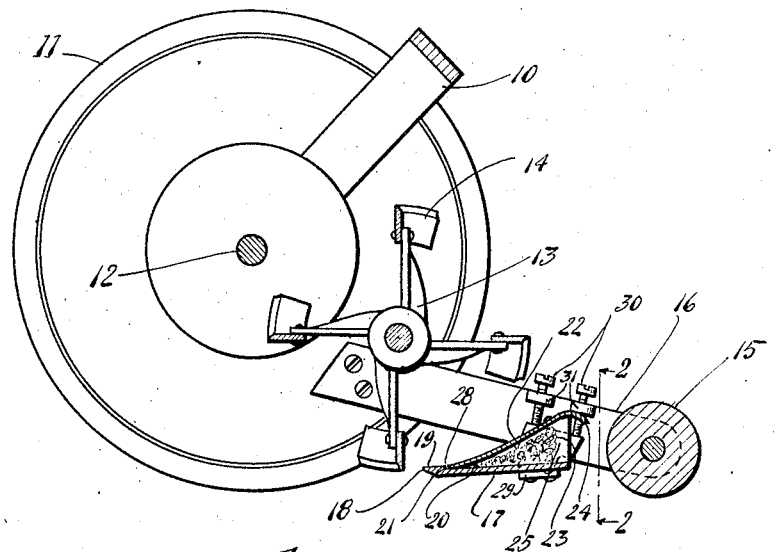
Figure 2:
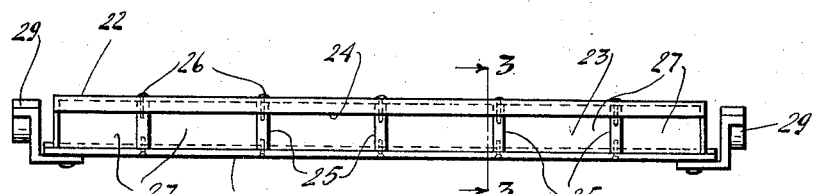
Fig. 2 is a fragmentary view taken substantially on line 2—2 of Fig. 1.
Figure 3:
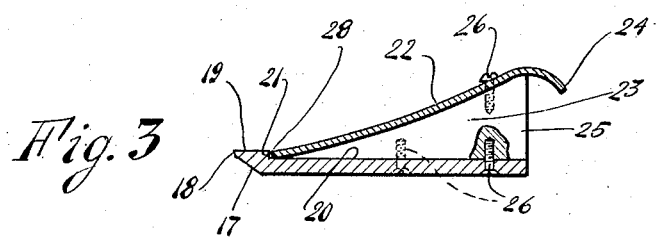
Fig. 3 is a sectional view taken substantially on line 3—3 of Fig. 2.

Referring to the drawing showing the preferred form of construction, 10 indicates a handle brace, 11 indicates one of the wheels of the lawn mower and 12 the shaft carrying the same. The rotating reel is indicated at 13 and includes a set of spiral knives 14 rotated by means and in a manner well known in the art. A runner is indicated at 15 and in the present instance is in the form of a roller supported for rotation by brackets 16. The stationary knife is indicated at 17 and has the usual straight edge 18 with an elevated portion 19 and a depressed portion 20 providing a small shoulder or ridge 21.

Arranged upon the stationary blade, is a sheet 22, the forward end of which abuts the shoulder or ridge 21 from which the sheet inclines upwardly over the blade to form therewith a housing 23. The sheet 22 has a curved end portion as indicated at 24, to prevent the grass or other matter, as the same passes thereover, from gaining entrance into the housing. The sheet 22 which constitutes the top wall of the housing is supported in elevated position, in spaced relation with the stationary blade by means of blocks 25 which are substantially triangular in shape as best shown in Fig. 1. To these blocks the sheet 22 and the stationary blade 17 are secured by means of screws 26. The blocks 25 divide the housing into a plurality of compartments 27 and in these compartments I pack a quantity of absorbent material, such as cotton batting or the like, and saturate this material with oil to such an extent that by reason of the forward inclination of the stationary blade the oil will find an exit at a point indicated at 28, where the forward edge of the sheet abuts the ridge 21. The stationary blade 17 is supported at an inclination relatively to the horizontal by the usual means which includes supporting bearings 29 and adjustable set screws 30 which are taken through lateral extensions 31 formed on the brackets 16.

It will be seen that by the oiling arrangement as herein set forth the oil is continually fed to the edge of the stationary blade with which the cutting edges of the knives cooperate for lubricating these cooperating parts at all times. It will be further seen from the description herein and by reference to the accompanying drawing that I provide a device which will extend the life of the cutting elements of a lawn mower thereby accomplishing all the objects sought.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent, is:

1. In a lawn mower, the combination with a rotary element carrying cutting knives, of a stationary blade having a cutting edge with which said cutting knives cooperate and having a shoulder extending adjacent to said cutting edge and means arranged upon said stationary blade for supplying oil along said shoulder.

2. In a lawn mower, the combination with a rotary element carrying cutting knives, of a stationary blade having a cutting edge with which said cutting knives cooperate and having a shoulder extending adjacent to said cutting edge, a housing mounted upon the stationary blade behind said shoulder, and means in said housing for supplying oil to said shoulder.

3. In a lawn mower, the combination with a rotary element carrying cutting knives, of a stationary blade having a cutting edge with which said cutting knives cooperate and having a shoulder adjacent to said cutting edge, and a housing having compartments constructed upon the stationary blade behind said shoulder and means in the compartments of said housing for supplying oil along said shoulder.

4. In a lawn mower, the combination with a rotary element carrying cutting knives, of a stationary blade having a cutting edge with which said cutting knives cooperate, a shoulder adjacent to said cutting edge, a plate abutting said shoulder and extending upwardly and rearwardly over the blade forming a shelter therefor, and partition members arranged between said blade and said plate.

In testimony whereof I have signed my name to this specification in the presence of two subscribing witnesses.

MARIUS I. MAGOON.

Witnesses:
FREDA C. APPLETON,
MARGARET AUER.